United States Patent
Kataria et al.

(10) Patent No.: US 6,687,229 B1
(45) Date of Patent: Feb. 3, 2004

(54) QUALITY OF SERVICE BASED PATH SELECTION FOR CONNECTION-ORIENTED NETWORKS

(76) Inventors: Deepak Kataria, 2406 Strawberry Ct., Edison, NJ (US) 08817; Dimitris Logothetis, 7855 Blvd. East, Apt. 22K, North Bergen, NJ (US) 07047; Santhanam Srinivasan, 46 Weller Pl., Holmedel, NJ (US) 07733; Malathi Veeraraghavan, 199 Sears Ave., Atlantic Highlands, NJ (US) 07716

(*) Notice: Subject to any disclaimer, the term of this patent is extended or adjusted under 35 U.S.C. 154(b) by 0 days.

(21) Appl. No.: 09/188,023

(22) Filed: Nov. 6, 1998

(51) Int. Cl.[7] ............................................. H04L 12/26
(52) U.S. Cl. ....................................... 370/238; 370/351
(58) Field of Search ................................. 370/238, 351, 370/252, 229, 230, 389, 410, 408, 237, 254, 255, 256, 257, 258

(56) References Cited

U.S. PATENT DOCUMENTS

| | | | | |
|---|---|---|---|---|
| 5,933,425 A | * | 8/1999 | Iwata | .......................... 370/351 |
| 6,084,858 A | * | 7/2000 | Matthews et al. | .......... 370/238 |
| 6,094,687 A | * | 7/2000 | Drake, Jr. et al. | .......... 709/241 |
| 6,256,309 B1 | * | 7/2001 | Daley et al. | ................ 370/395 |
| 6,304,549 B1 | * | 10/2001 | Srinivasan et al. | ......... 370/230 |

* cited by examiner

Primary Examiner—Chi Pham
Assistant Examiner—Alexander O. Boakye
(74) Attorney, Agent, or Firm—Matthew J. Hodulik

(57) ABSTRACT

Arrangements and methods for improving the probability of finding a connection path that meets user specified delay requirements. The improvements offer packet switches enhanced path selection that will improve the resource utilization of networks, both flat networks and hierarchical networks incorporating such switches. The latter type of networks run the path selection algorithm in the PNNI v1.0 standard where the packet switches are asynchronous transfer mode switches. Two modes of enhanced delay-based path selection are based on two different accumulation methods, namely an additive method and an asymptotic method.

21 Claims, 14 Drawing Sheets

HIERARCHICAL NETWORK

QUALITY OF SERVICE BASED PATH SELECTION FOR CONNECTION-ORIENTED NETWORKS

TECHNICAL FIELD

This invention relates generally to the field of telecommunications and in particular to a method for selecting a transmission path in a connection-oriented network.

BACKGROUND OF THE INVENTION

It is apparent that connection-oriented networks will play an increasing role in data networking. Connection-oriented networking offers important advantages over connectionless networks, including the advantage of providing Quality of Service (QoS) guarantees, which facilitate new classes of applications such as multimedia.

A connection-oriented network includes of a set of switches interconnected by point-to-point links or interfaces. The switches support two kinds of interfaces: user-network interfaces (UNI) and network-to-network or network-node interfaces (NNI). A UNI connects end-systems (hosts, routers, and so on) to a switch, while an NNI may be imprecisely defined as an interface connecting two switches together. More precisely, however, an NNI is any physical or logical link across which two switches exchange the NNI protocol. Various NNI protocols, such as the Private Network-Network Interface (PNNI) protocols designed for asynchronous-transfer-mode networks, include a routing protocol that exchanges metrics, such as available and maximum bandwidth, cell loss ratio (CLR) and cell delay variation (CDV), related to Quality of Service (QoS). Routes are then computed using the data collected by the routing protocol. Most commonly-used route determination algorithms (such as Dijkstra calculations) use single, cumulative metrics such as link weightings or counts.

Other path selection algorithms, as the one proposed in the PNNI v1.0 standard, use a simple Generic Connection Admission Control (SGCAC) procedure to account for bandwidth. However, neither the SGCAC nor the complex GCAC proposed in PNNI v1.0 is effective in providing the QoS guarantees expected by many data networking customers.

In more detail, the problems in connection-oriented data networking arise out of the following typical existing situations.

As an example of routing and signaling in a connection-oriented network, the PNNI signaling protocol is used to set up asynchronous-transfer-mode switch connections between the source end-system and the destination end-system. The UNI signaling request is mapped into PNNI signaling at the ingress switch. The PNNI signaling is remapped back into UNI signaling at the egress switch. The PNNI signaling protocol is an extension of the UNI signaling and incorporates additional Information Elements (IEs) for PNNI related parameters such as the Designated Transit List (DTL). The PNNI routing protocol is used to disseminate topology, loading conditions and reachability data. For scalability reasons, the notion of hierarchical peer groups is created with Peer Group Leaders (PGLs) elected for each peer group. The PNNI routing protocol is used for hierarchical aggregation and propagation of information. Data about a peer group is aggregated by the peer group leader, which then distributes this data to all the nodes in the higher-level peer group in PNNI Topology State Packets (PTSPs). Thus, aggregated data is passed "up" the hierarchy by peer group leaders. Nodes in a peer group receiving data sent by one of their peer nodes at the higher levels of hierarchy distribute the received data "down" the hierarchy. This allows a switch to maintain a view of the "global" topology with reachability information for endpoints.

The PNNI routing protocol supports a large number of link and node state parameters that are advertised by the switches to indicate their current state at regular intervals which enables QoS-sensitive routing. This includes two types of parameters: attributes, such as Available Cell Rate, Cell Rate Margin, Variance Factor, used to determine whether a given network link or node can meet requested QoS; and metrics, such as maxCTD, CDV, CLR, AW, that are used to determine whether a given path, consisting of a set of concatenated links and nodes (with summed link metrics), can meet the requested QoS. The link metrics and attributes are per port per service category. Individual nodes (physical or logical) will need to determine and then advertise the values of these parameters for themselves.

As a result of these exchanges, a topology database is created, which has reachability information for all the network nodes and the available resources on the network links and nodes. All network nodes can obtain an estimate of the current state of the entire network. Unlike most current link state protocols, the PNNI routing protocol advertises not only link metrics but also nodal information.

When a switch receives a connection setup request, a number of steps are executed. Among these are Connection Admission Control (CAC), Generic Connection Admission Control (GCAC) and shortest path computation. CAC is used to determine if the requested connection can be admitted without violating QoS guarantees of established connections. CAC is a local switch function, and is, dependent on the architecture of the switch and local decisions on the strictness of QoS guarantees required by the switch. The other two algorithms, GCAC and shortest-path computation, are used by the ingress node receiving a connection setup request to determine a shortest-path hierarchical route for the connection while ensuring that all the links on the path have the available cell rate (bandwidth) requested for the connection. This form of routing, where the ingress node determines the shortest-path for the connection, is referred to as source routing. The PNNI v1.0 standard specifies two GCAC algorithms: simple GCAC and complex GCAC. Either of these algorithms can be used to determine if each link on a selected path has the requisite available cell rate (bandwidth) for the connection. The shortest path computation is essentially an execution of a shortest-path algorithm, such as Dijkstra's or Bellman-Ford's, with the link and node weights set to those of the metrics advertised in the received topology information.

Since PNNI networks are hierarchical, the shortest-path computed by the ingress node (after applying Dijkstra's algorithm and the GCAC available cell rate check algorithm) does not specify the exact set of switches through which the connection must be routed. Instead, it specifies a stack of Designated Transit Lists (DTLs), one identifying the physical switches in its peer group, and others identifying logical switches in higher-level peer groups. The DTLs are passed as parameters in the SETUP message. This eliminates the need for intermediate nodes (except border nodes of peer groups) to perform route selection. The border node of each peer group is involved in route selection since nodes outside a peer group P do not have a detailed picture of the topology and loading conditions of the peer group P. The border node through which the connection setup enters the peer group computes a DTL for its peer group and places this on the stack of DTLs as it propagates the PNNI SETUP message.

Once a path has been selected for the connection, each node on the path executes CAC (Connection Admission Control) to ascertain that it can admit the connection without violating guarantees for existing connections. Each node in the path needs to perform its own connection admission control because its own state may have changed since it last advertised its state with the network used for the GCAC at the ingress or border node.

If the connection admission control procedure is successful, each node then programs the switch fabric with channel identifier translation information and with information for user-plane algorithms, such as scheduling, UPC (Usage Parameter Control), traffic shaping, etc.

The signaling protocol is used to send a message from node to node to complete connection setup. Once a connection is set up, user data packets are forwarded through each node according to the channel identifier translation information. Since the route selection phase (executing shortest-path and GCAC algorithms) could consume a significant amount of time, route precomputation is suggested in Appendix H of the PNNI v1.0 specification. Precomputing routes could potentially speed up the route selection process. With precomputed paths, a connection setup request is handled by the ingress switch first determining the destination switch (logical node) through which to reach the called endpoint. If a precomputed route exists to the destination switch, the GCAC algorithm is applied to each link of the precomputed path to check for cell rate availability.

If this test passes, the route selection step is complete. If not, an "on-the-fly" route selection, consisting of both shortest-path and GCAC algorithm executions, is needed.

Again, each node in the path needs to perform its own connection admission control because its own state may have changed since it last advertised its state within the network used for the GCAC at the ingress or border node.

The new services and reduced rates made possible by such peer groups of networks and nodes have been very attractive to users, but poorly-controlled delays and occasional failure of connectability have been drawbacks.

SUMMARY OF THE INVENTION

According to the present invention, path selection in connection-oriented data networking is made delay-based.

A method according to one aspect of the invention provides an algorithm for shortest path selection based on a single delay metric for data network connection. Both for the precomputation of routing tables and for computation on-the-fly, either for a flat network or a hierarchical network, path delay is accumulated by either an additive method or an asymptotic method.

According to a further aspect of the invention, routing equipment in connection-oriented data networks is adapted to use either of the algorithms.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

Figure 1A:
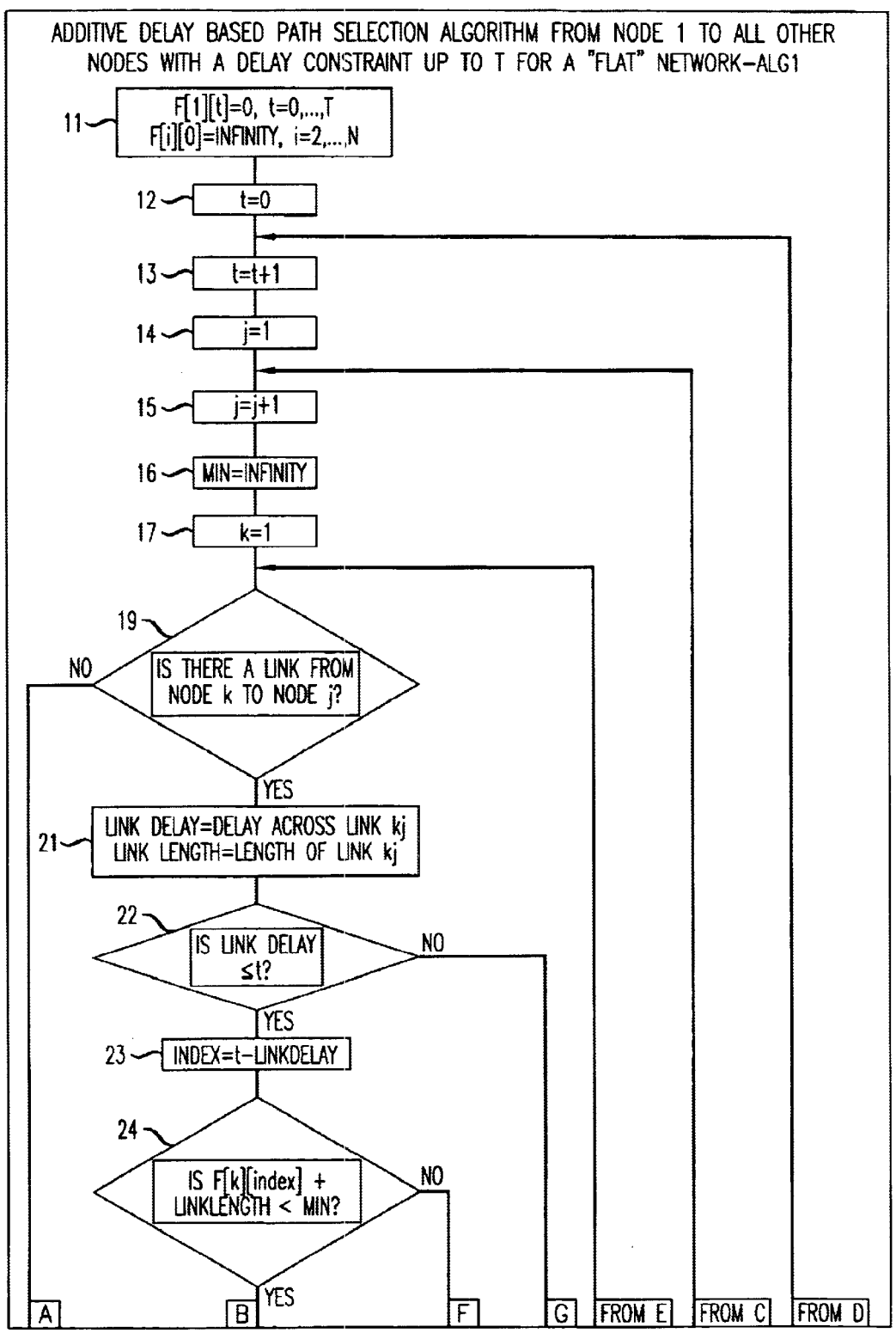
FIGS. 1A and 1B show an additive-delay-based path selection algorithm.

A preferred embodiment of the invention will now be described while referring to the figures, several of which may be simultaneously referred to during the course of the following description.

The following technical background will be helpful in understanding the terminology that is definitive of the preferred implementations of the present invention.

Large networks are typically hierarchically arranged in peer groups. Within each peer group nodes acquire extensive knowledge of relevant network topology. Thus, such peer groups of nodes in New York City would have relatively great knowledge of the New York City portion of the network, but relatively less knowledge of the topology of the New Jersey portion of the network. A higher-level peer group of logical nodes that represent New Jersey and New York would acquire knowledge about the interconnection of their respective lower-level peer groups.

Controlling delay according to existing techniques without regard to certain additional practical constraints does not provide customers with perceived satisfactory solutions to their needs. Shortest path algorithms, such as Dijkstra's, are executed with an additive metric assigned to the links and nodes of the network. AW (Administrative Weight) is an "additive" metric[2]. The simple and complex GCAC procedures defined in the telecommunications standard PNNI v1.0 test whether each link has the available bandwidth required to admit the new call. Available cell rate (bandwidth) is identified as an "attribute" in that it is not an additive metric. Thus, shortest-path algorithms are applied with additive metrics, while GCAC is applied with a non-additive metric. The question of whether maxCTD (maximum Cell Transfer Delay) and peak-to-peak CDV($\alpha$) (the $\alpha$ quantile of the Cell Delay Variation) are additive metrics or not, and hence whether they should be included in the shortest-path determination phase or GCAC phase has not been addressed. Appendix H of the PNNI v1.0 standard specification indicates that delay could be used in the shortest-path computation phase implying that it is an additive metric. Nevertheless, if a weighted average of CDV and AW metrics is used, the solution may not meet the end-to-end CDV constraint. This would require a second step to test whether the "shortest" path meets the end-to-end CDV requirement.

Furthermore, CDV has been identified as being a non-additive metric. Simply adding the CDV contributions from the switches on a path leads to a very pessimistic estimate of the end-to-end CDV.

Specifically, only the administrative weights have been used for route selection. The delay metrics have not been used in the route selection process. If delay metrics were to be used, typical implementation would call for joint optimization with the administrative weights since path trees created during route precomputing provide only one path from the source to the destination.

Some of the delay metrics that could be used in implementing the present invention include the following. Cell Transfer Delay (CTD) is defined as the elapsed time between a cell exit event at the source UNI and the corresponding cell entry event at the destination UNI for a particular connection. The Cell Transfer Delay is, therefore, the sum of the total inter-ATM node transmission delay and the total ATM node processing delay in the path. Two end-to-end delay parameter objectives are negotiated: Peak-to-Peak CDV and maxCTD. Peak-to-peak CDV (Dell Delay Variation) is defined as the $\alpha$ quantile of the CTD minus the fixed CTD. The term peak-to-peak refers to the difference between the best and the worst case of CTD, where the best case equals to fixed delay and worst case equals to a value likely to be exceeded with probability no greater than (1-$\alpha$).

According to separate aspects of the present invention, both a method and an apparatus include such delay metrics in the route selection process.

An additive-delay-based path selection algorithm according to a first implementation of the present invention will now be explained with reference to FIG. 1.

The additive method for accumulating peak-to-peak CDV may be described in overview as follows. A switch at an additional node to be connected in the path receives the accumulated peak-to-peak CDV and adds its own contribution of the peak-to-peak CDV ($\alpha$) to the accumulated peak-to-peak CDV. This approach is based on estimating the end-to-end CDV ($\alpha$) as the sum of individual CDV ($\alpha$) values along the path from source to destination. If there are N switches along the path and if we denote the ($\alpha$) quantile of CDV in switch i by $CDV_i(\alpha)$, then the total accumulated CDV is:

$$CDVtotal(\alpha) = \sum_{i=1}^{N} CDVi(\alpha) \quad (1)$$

This simple method requires only one parameter, CDV, for its computation. The estimated CDV is always an upper bound of the actual CDV but it may be very conservative for connections that traverse many hops.

Figure 1B:
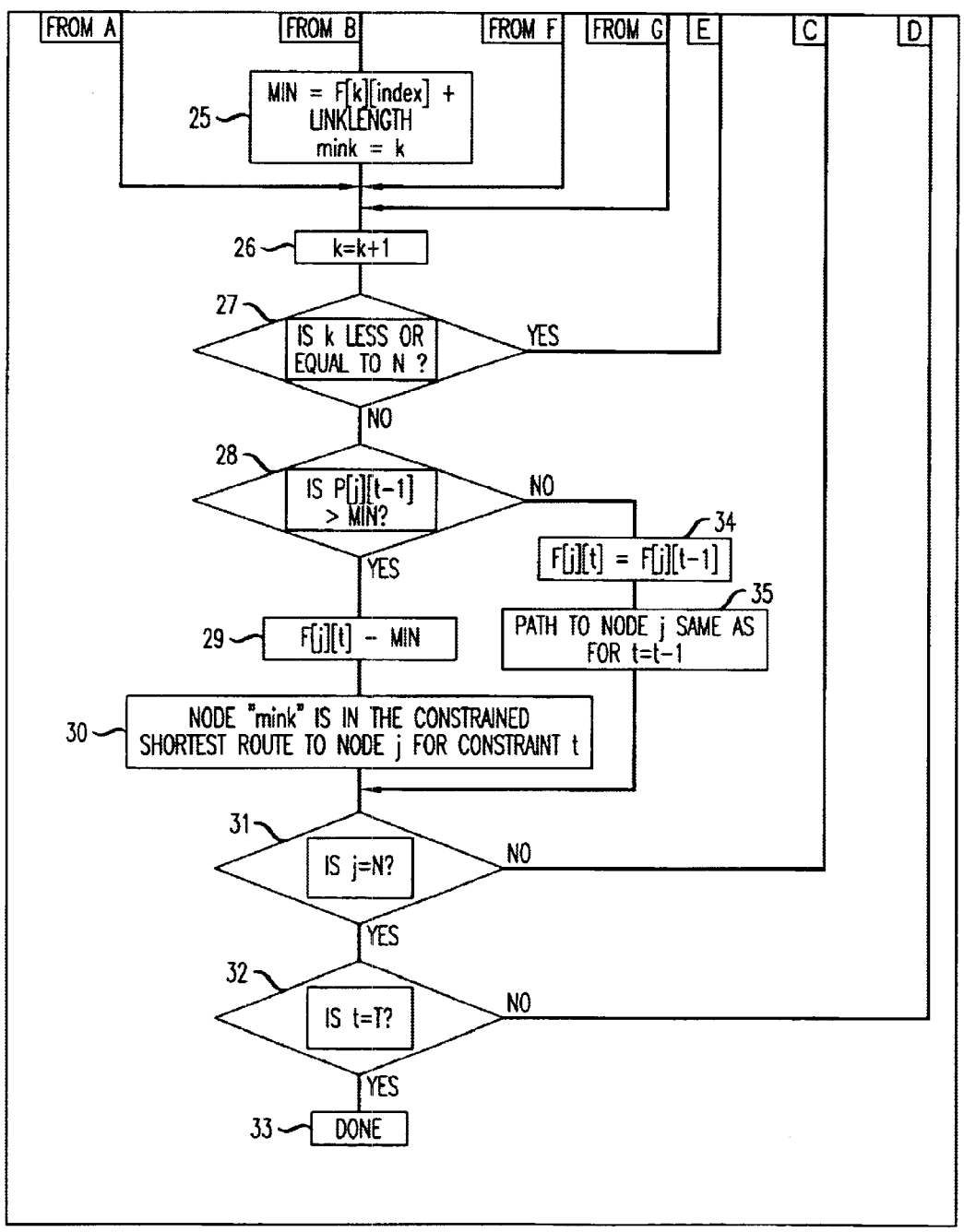

In more detail, with reference to FIGS. 1A and 1B, the constrained shortest path problem is solved using dynamic programing procedures assuming a discretized and bounded domain for the CDV and performing an exhaustive search over it. Define $1_{ij}$ and $t_{ij}$ to be the AW and the CDV of the link that connects nodes i and j, respectively. Let T be an upper bound (delay constraint up to T) on the end-to-end CDV of any path in the network and $f_i(t)$ the length of a shortest path from node 1 to node i with CDV less or equal to t.

Step 11 in FIG. 1A includes the following steps: (See R. Hassin, *Approximation Schemes for the Restricted Shortest Path Problem, Mathematics of Operations Research*, Vol 17, No. 1, February, 1992, pp. 36–42.)

1. Initialize $f_1(t) = 0, \quad t = 0, \cdots, T$

2. Initialize $f_j(0) = \infty, \quad j = 2, \cdots, N,$ where the $\infty$ implies a number large enough that a sufficiently exhaustive search of possible links can be made.

Steps 12–17 represent the sequencing of variables in the following command:

Compute $f_j(t) = \min\{f_j(t-1), \min_{k|tkj \leq t}\{f_k(t-t_{kj}) + 1_{kj}\}\} j = 2, \ldots, N, t = 1, \ldots, T$     3.

Decision circuit 19 determines whether there is a link from node k to node j. In the latter event, step 21 retrieves link delay across link kj and link length from a topology data base for the peer group of networks (See FIG. 11.). So long as the retrieved link delay is greater than the previously accumulated value t, decision circuit 22 allows the process to increment k (Step 26).

As seen in the lower part of FIG. 1A, index circuit 23 and decision circuit 24 allow the process to increment k if a function of the index and the linklength is not less than a prescribed value MIN. If the function is less that MIN, MIN is set equal to the function, at Step 25. Then, and also by repeat of steps 19–25 when k becomes greater than N (decision circuit 27), decision circuit 28 tests whether f(j)(t-1) is greater than MIN. If it is, Then f(j)(t) is equal to MIN (Step 29); and node min k is in the path to node j (step 30). If not, then f(j)(t) is set equal to f(j)(t-1)(step 34).

If delay has not reached the maximum T, then step 31 of the process allows t to increment. If delay has reached T, step 32 tests whether j has reached N. If not, j is incremented. If j has reached N, the process is stopped (Step 33).

The complexity of the above algorithm is O(n1T), with i and I the number of nodes and links in the network, respectively. Compare this with Dijkstra's algorithm, of $O(n^2)$.

TABLE 1

Execution times for dense networks (connectivity = 0.7)

| Number of nodes | Number of links | Dijkstra's algorithm ($\mu$secs) | Constrained shortest path algorithm ($\mu$secs |
|---|---|---|---|
| 5 | 7 | 14 | 759 |
| 7 | 15 | 25 | 1434 |
| 10 | 31 | 51 | 2671 |
| 12 | 45 | 70 | 3705 |
| 15 | 73 | 111 | 5635 |
| 18 | 108 | 150 | 8046 |
| 20 | 141 | 188 | 10505 |

TABLE 2

Execution times for sparse networks (connectivity = 0.2)

| Number of nodes | Number of links | Dijkstra's algorithm (μsecs) | Constrained shortest path algorithm (μsecs) |
|---|---|---|---|
| 5 | 2 | 13 | 566 |
| 7 | 2 | 25 | 893 |
| 10 | 7 | 51 | 1726 |
| 12 | 11 | 71 | 2375 |
| 15 | 17 | 109 | 3892 |
| 18 | 32 | 153 | 5225 |
| 20 | 51 | 183 | 6038 |

A quantitative comparison of the execution times as a function of the number of network nodes is shown for dense and sparse networks in Tables 1 and 2, respectively. A measure called "connectivity" was used while generating random topologies for this exercise.

From the tables above, one observes that constrained shortest path algorithm is consistently slower than Dijkstra's algorithm and does not scale well for large and dense networks. The configuration of FIG. 11 uses it only for "precomputations", where these considerations are not a problem, rather than "on-the-fly" computations.

Figure 2:
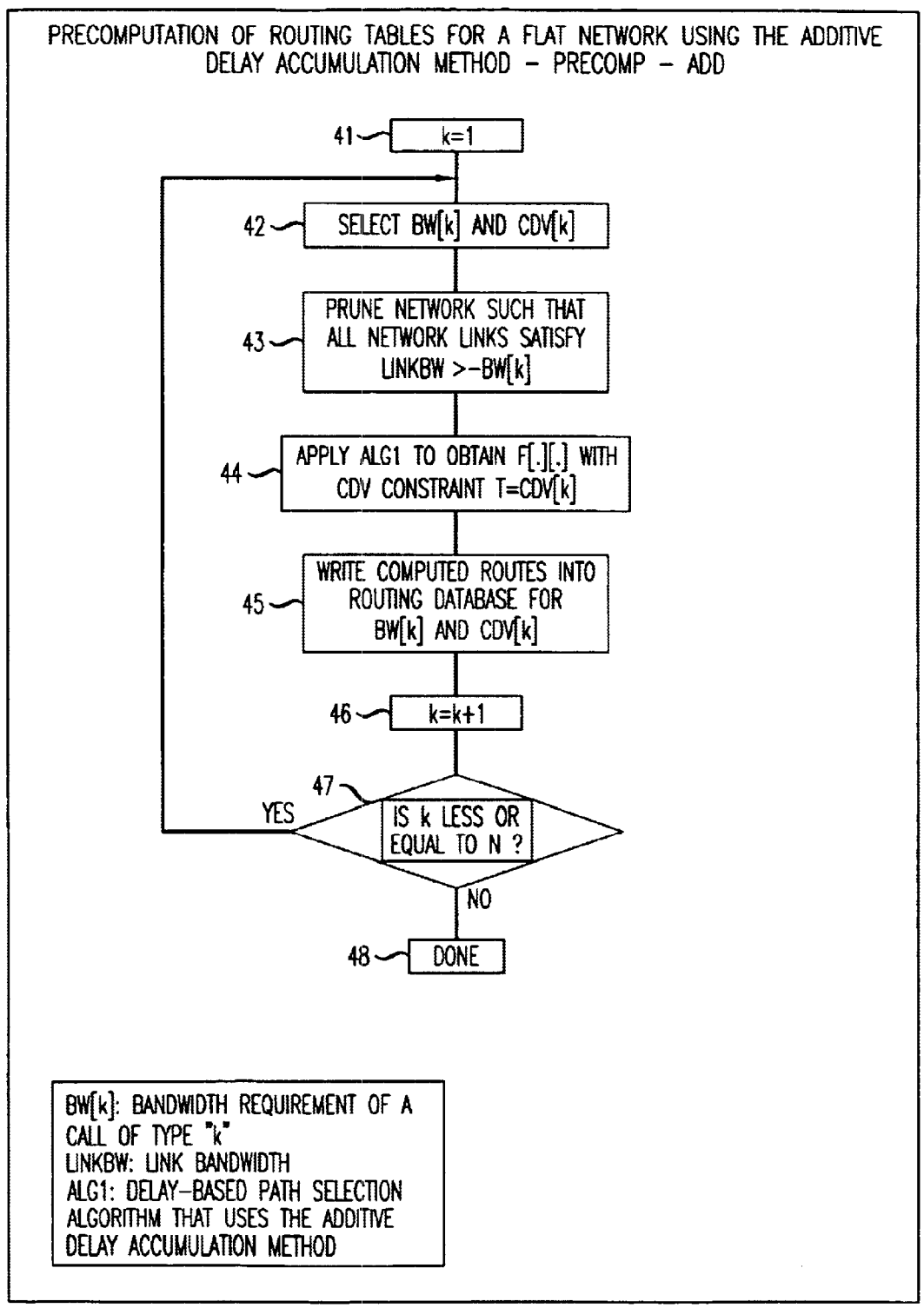
FIG. 2 shows a flow chart for the precomputation of routing tables in a flat network using the algorithm of FIGS. 1A and 1B.

As shown in FIG. 2, the algorithm of FIGS. 1A and 1B is used, according to the present invention, in the precomputation of routing tables in a flat (non-hierarchical) network. The flow diagram of FIG. 2 basically implements precomputation of "shortest path" routes using the shortest path algorithm described above and stores the routes for different values of CDV (or t) in a routing table or cache memory (See FIG. 11). Store the path(s) in a cache of the form (Traffic descriptor, CDV, route).

In more detail, in FIG. 2, the precomputation of routing tables starts with the selection of one (e.g., k=1) of the numbers and sizes of bandwidths (BW(k)) and cell delay variation (CDV(k)) options available for interconnection in the network. Thus, step 41 sets k=1, and step 42 selects BW(k) and CDV(k).

Step 43 then prunes the search of the network so that only links having bandwidth greater than BW(k) are investigated. Step 44 applies the algorithm of FIGS. 1A and 1B to find the shortest paths f satisfying the CDV(k) requirement from the node in which this algorithm is being executed to all other nodes in the network. Step 45 writes the result into the routing table. As indicated in steps 46–48, this procedure is repeated for each available bandwidth and cell delay variation that may appear in a call setup request.

Figure 3:
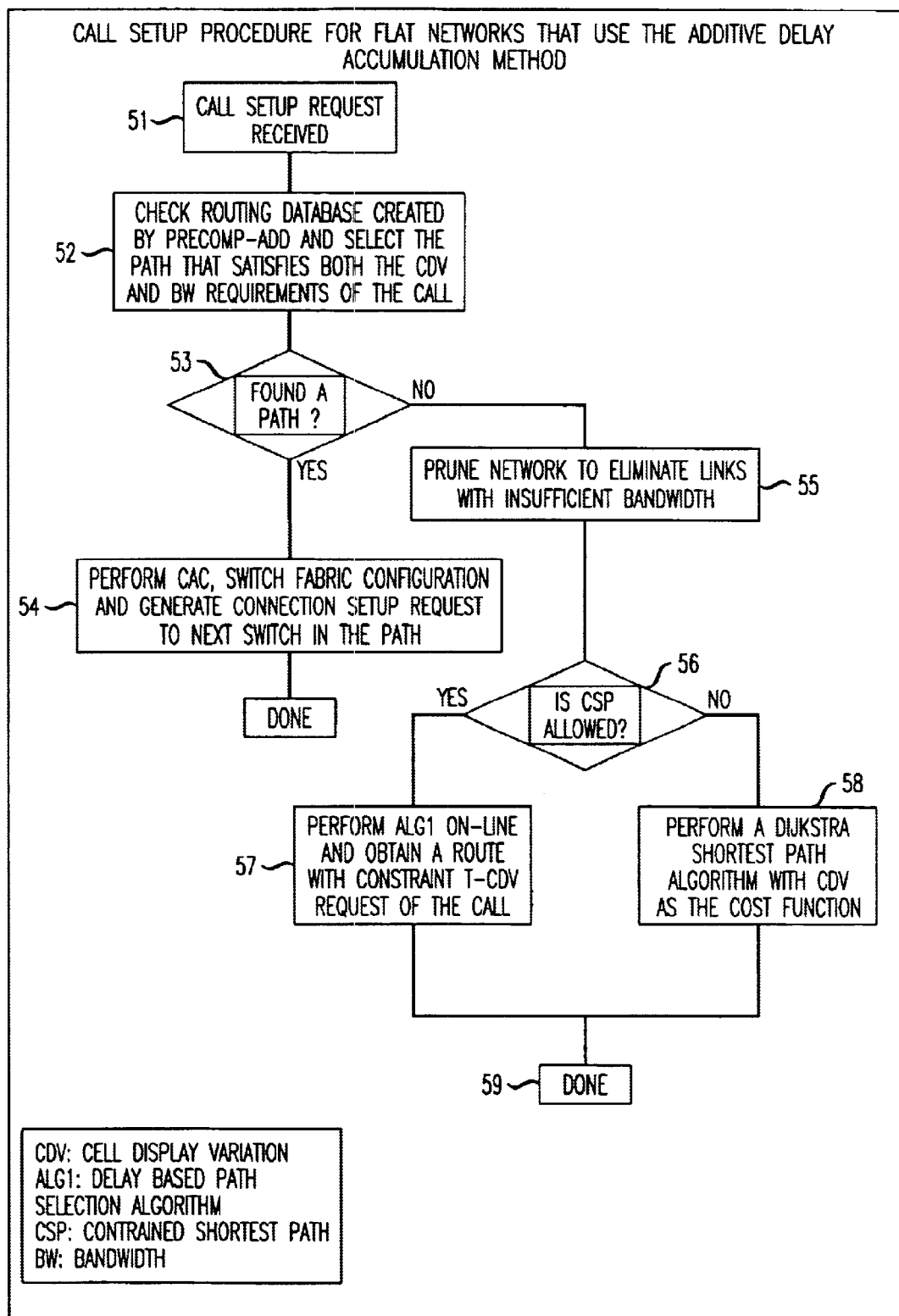
FIG. 3 shows a call setup procedure at a switch for a flat network using routing data created according to FIGS. 1A, 1B, and 2.

FIG. 3 illustrates the call setup procedure invoked by a call setup request (Step 51) in a flat network.

When the call setup request arrives at a switch (See FIG. 11), step 52 selects an optimal path from the table of precomputed routes that satisfies both the CDV and BW constraints in the call setup request.

Step 53 checks whether a path was found. If so, in step 54, call admission control and switch configuration are performed, and a connection setup request to the next switch in the path is generated. If not, an on-the-fly procedure, starting at step 55, is invoked to find an appropriate path. Step 55 prunes the search so that network links with insufficient bandwidth to satisfy the call setup request are not searched. Before the on-the-fly search is actually commenced, step 56 employs a decision circuit to decide whether the use of the constrained shortest path algorithm of FIGS. 1A and 1B is allowed. The answer is "Yes" if its use is judged to be not too expensive in terms of time and resources. Then step 57 uses the algorithm of FIGS. 1A and 1B in real time. Otherwise the answer is "No", and step 58 performs a Dijkstra shortest path algorithm with cell delay variation as the cost function. Once a path is found, the procedure is ended (step 59).

The second delay-based path-selection algorithm, according to a feature of the invention, employs delay accumulation calculated by the so-called asymptotic method. This is an existing measure that has heretofore been used for other purposes. It uses both mean and variance of transfer delay, and the actual delay variation in each switch, in order to compute the end-to-end CDV. The intuition behind this is the central limit theorem. Irrespective of the distributions of individual random variables are, the sum of the random variables is normally distributed as N gets large. The error is compensated by adding the maximum difference between the estimate and actual CDV in the switches along the path. The end-to-end CDV over N switches, assuming independent delays in the switches, is given by:

$$CDV_{total}(\alpha) = \sum_{i=1}^{N} \mu_i + \sqrt{\sum_{i=1}^{N} \sigma_i^2} \times t(\alpha) + \max_{1 \le i \le N} \{CDV_i(\alpha) - (\mu_i + \sigma_i t(\alpha))\}. \quad (2)$$

where, $t(\alpha)$ denotes the $\alpha$ quantile of standard normal distribution, $\mu_i$ denotes the mean delay in switch i, and $\sigma_i$ denotes the standard deviation of delay in switch i. The quantity $$d(\alpha) = \{CDV_i(\alpha) - (\mu_i + \sigma_i \times t(\alpha))\} \quad (3)$$

is referred to as discrepancy, $d(\alpha)$. This method is also an upper bound of the actual CDV but the bound is much tighter when compared with the additive method. The asymptotic method requires each switch to report four parameters: mean queuing delay ($\mu$), variance of queuing delay ($\sigma$), discrepancy parameter $d(\alpha)$, and fixed delay f.

Figure 4A:
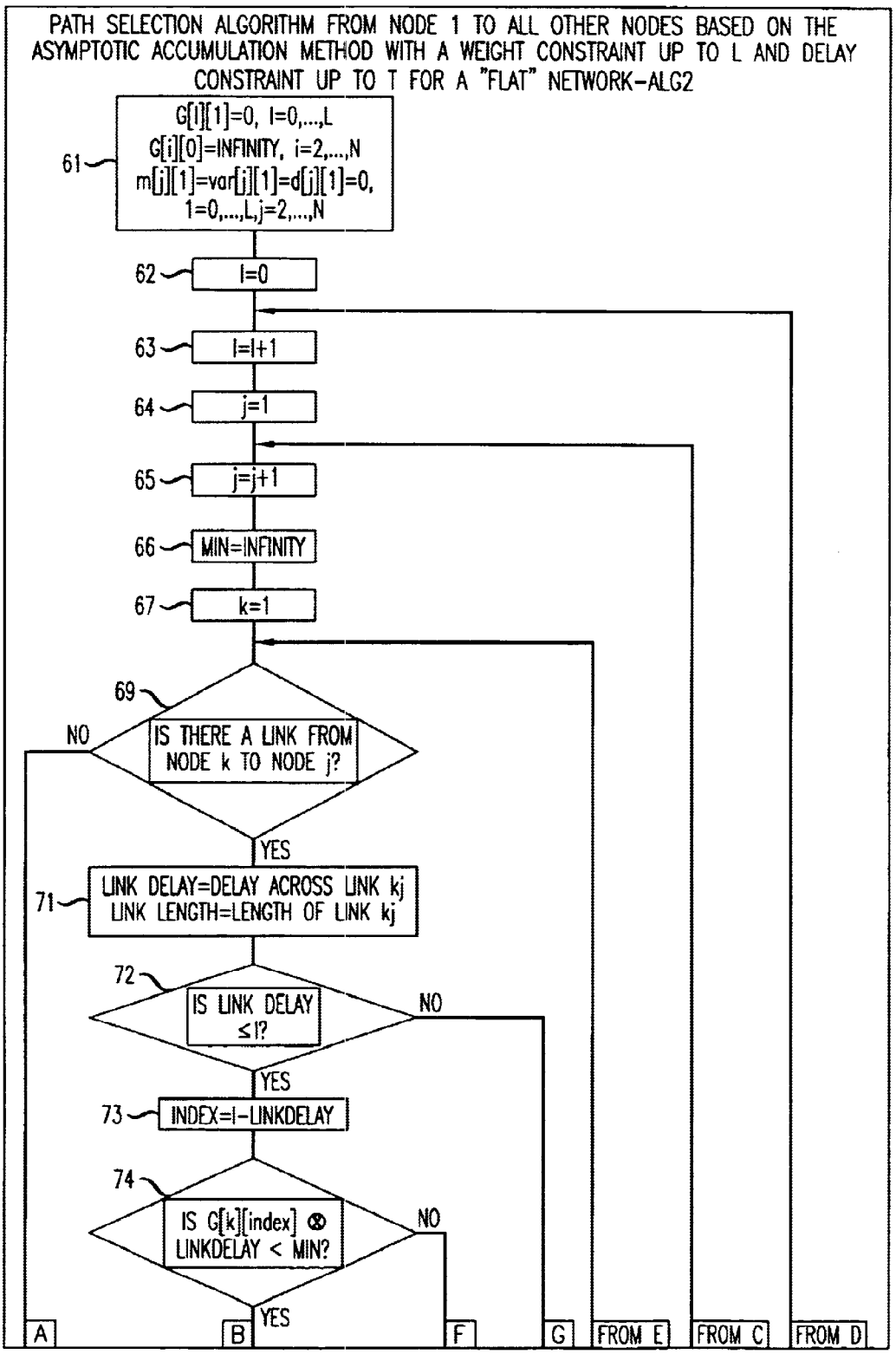
FIGS. 4A and 4B show an asymptotic-delay-based path selection algorithm.
Figure 4B:
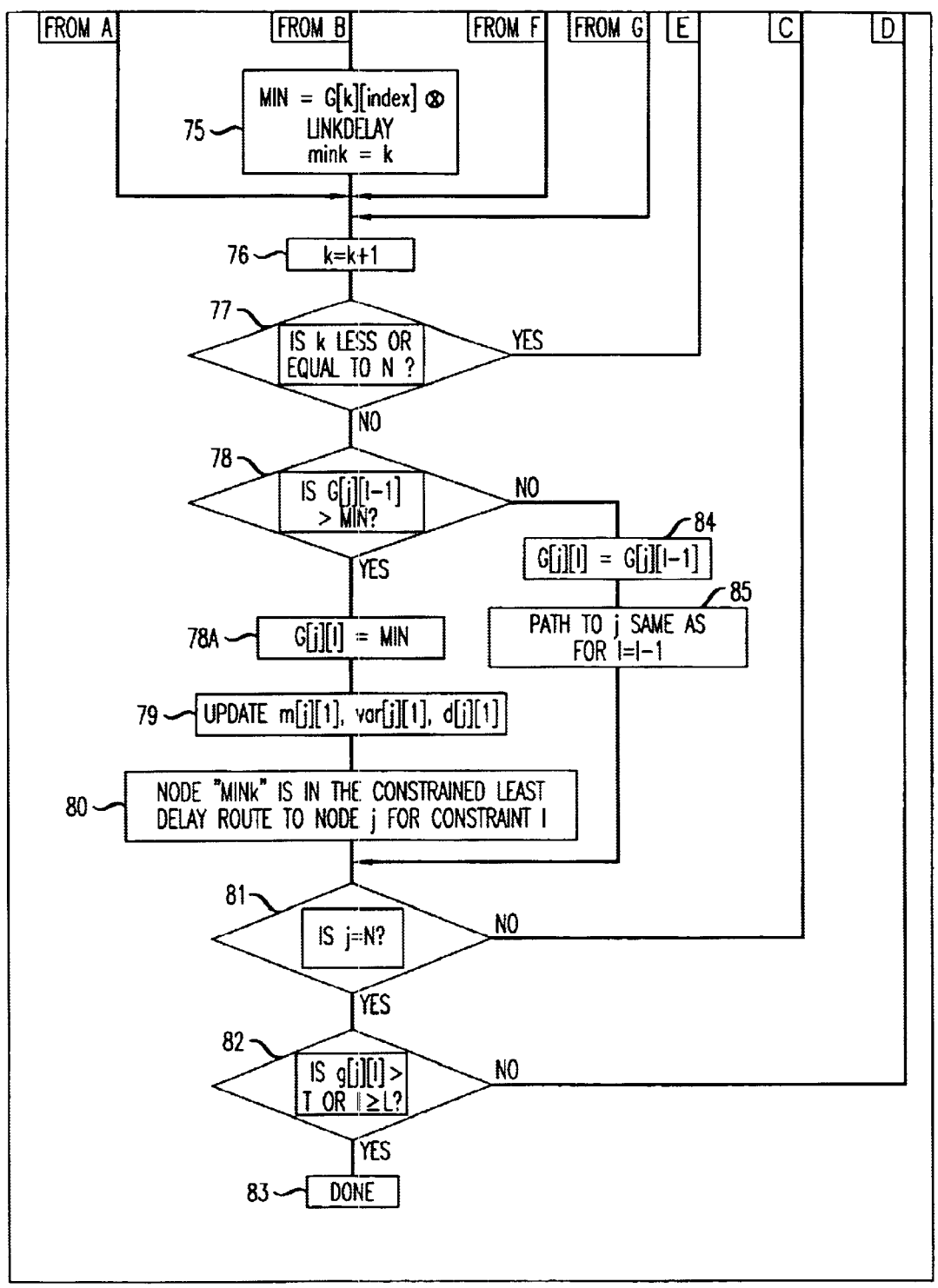

In the present implementation of this approach, as set forth in FIGS. 4A and 4B, asymptotic-type delay accumulation is set forth in a algorithm that may be appreciated to be a variation of that of FIGS. 1A and 1B. The significant difference in the algorithm of FIGS. 4A and 4B as compared to that of FIGS. 1A and 1B resides in the use of the above four parameters. All other components and/or steps are the same or essentially similar to those in FIGS. 1A and 1B.

To modify the dynamic programming procedure for the constrained shortest path algorithm of the previous subsection, proceed as follows: Define $1_{ij}$ and $t_{ij}$ the AW and the CDV of the link that connects nodes i and j, respectively. Let L be an upper bound on the end-to-end delay of any path in the network. Let also $g_i(l)$, $\mu_i(l)$, $\sigma_i^2(l)$ and $d_i(l)$ the CDV, the (cumulative) mean of the delay, the (cumulative) variance of the delay and the discrepancy of the delay of a shortest path from node 1 to node i with AW at most 1.

1. Initialize $g_1(l) = 0, \quad l = 0, \cdots, L$           (6)

2. Initialize $g_j(0) = \infty, \quad j = 2, \cdots, N$

3. Initialize $\mu_j(l), \sigma_j^2(l) = d_j(l) = 0, l = 0, \cdots, L, j = 2, \cdots N$ 4. Compute $g_j(l) = \min\{g_j(l-1), \min_{k|l_{kj} \le l} \{g_k(l-1_{kj}) \otimes t_{kj}\}\}$ $j = 2, \cdots, N, l = 1, \cdots, L$ with $g_k \otimes t_{kj}$ is $\mu_k(l-l_{kj}) + \mu_{kj} + \left[\sqrt{\sigma_k^2(l-l_{kj})} + \sigma_{kj}^2\right] \times t(\alpha) +$ $\max\{d_k(l-l_{kj}), d_{kj}(\alpha)\}$ defined as:

where $\mu_{kj}$, $\sigma_{kj}$, and $d_{kj}(\alpha)$ denote the mean, the variance and the discrepancy of link that connects nodes k and j.

In more detail, step 61 in FIG. 4A includes initialization of variables according to the four steps outlined above.

Again, the ∞ implies a number large enough that a sufficiently exhaustive search of possible links can be made.

Steps 62–67 represent the sequencing of variables in the calculation of step 4 set out above. Decision circuit 69 determines whether a link exists from node k to node j. In the latter event, step 71 retrieves link delay across link kj and link length from a topology data base for the peer group of networks (See FIG. 11.). So long as the retrieved link length is greater than the previously accumulated value l, decision circuit 72 allows the process to increment k (step 76).

As seen in the lower part of FIG. 4A, index circuit 73 and decision circuit 74 allow the process to increment k if a function of the index and the link delay is not less than a prescribed value MIN. If the function is less that MIN, MIN is set equal to the function, at Step 75. Then, and also by repeat of steps 69–75 when k becomes greater than N (decision circuit 77), decision circuit 78 tests whether G(j) (l−1) is greater than MIN. If it is, then G(j)(l) is equal to MIN (Step 79); and node min k is in the path to node j (step 80). If not, then $G_j(l)$ is set equal to G(j)(l−1) (Step 84).

Step 81 tests whether j=N. If not, j is incremented. In step 82, a decision circuit tests whether delay or length has reached a mazimum. If not, l is allowed to increment (step 63 in FIG. 4A). If either has occurred, the process is stopped (Step 83).

Figure 5:
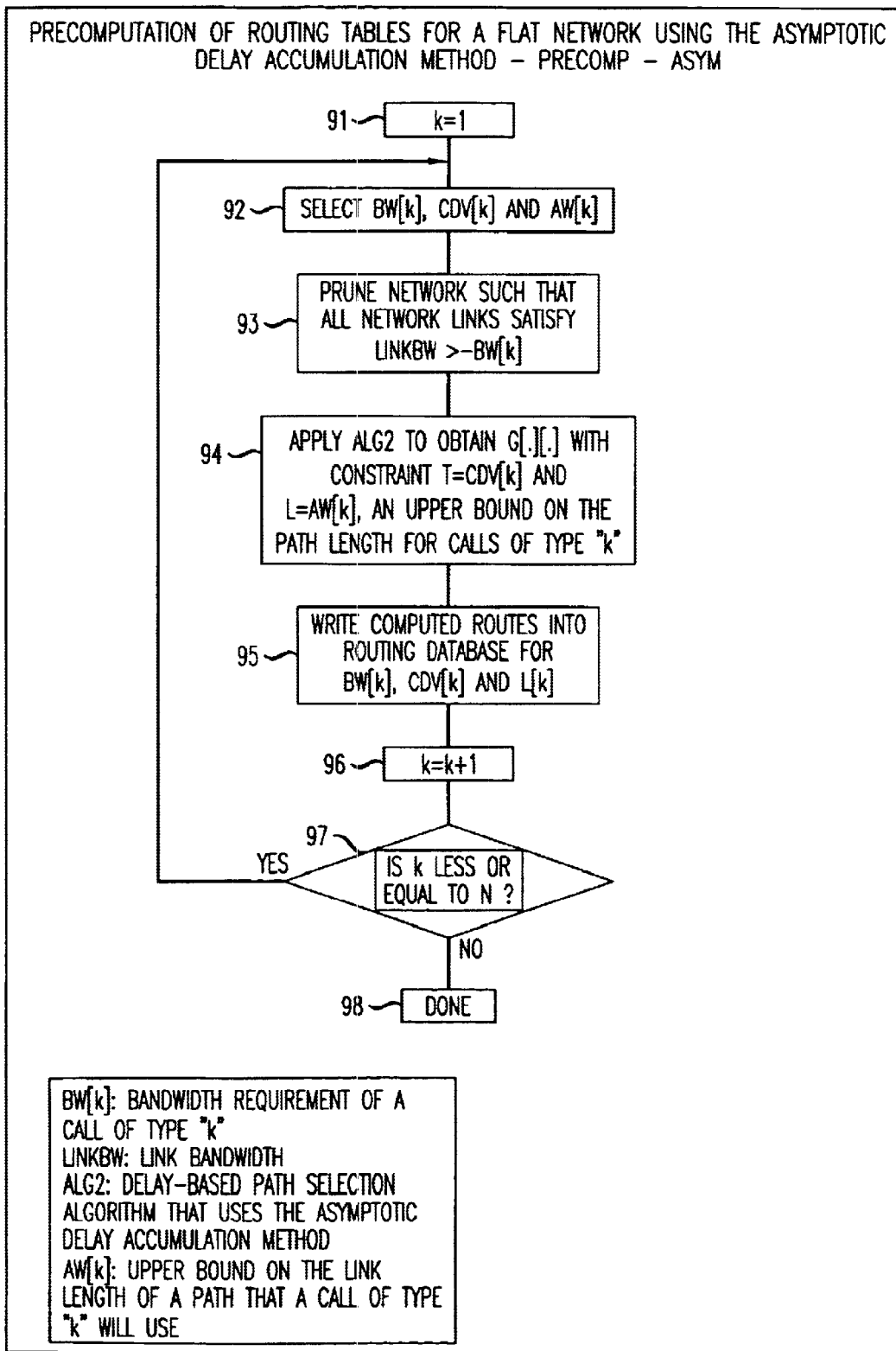
FIG. 5 shows a flow chart for the precomputation of routing tables in a flat network using the algorithm of FIGS. 4A and 4B.
Figure 11:
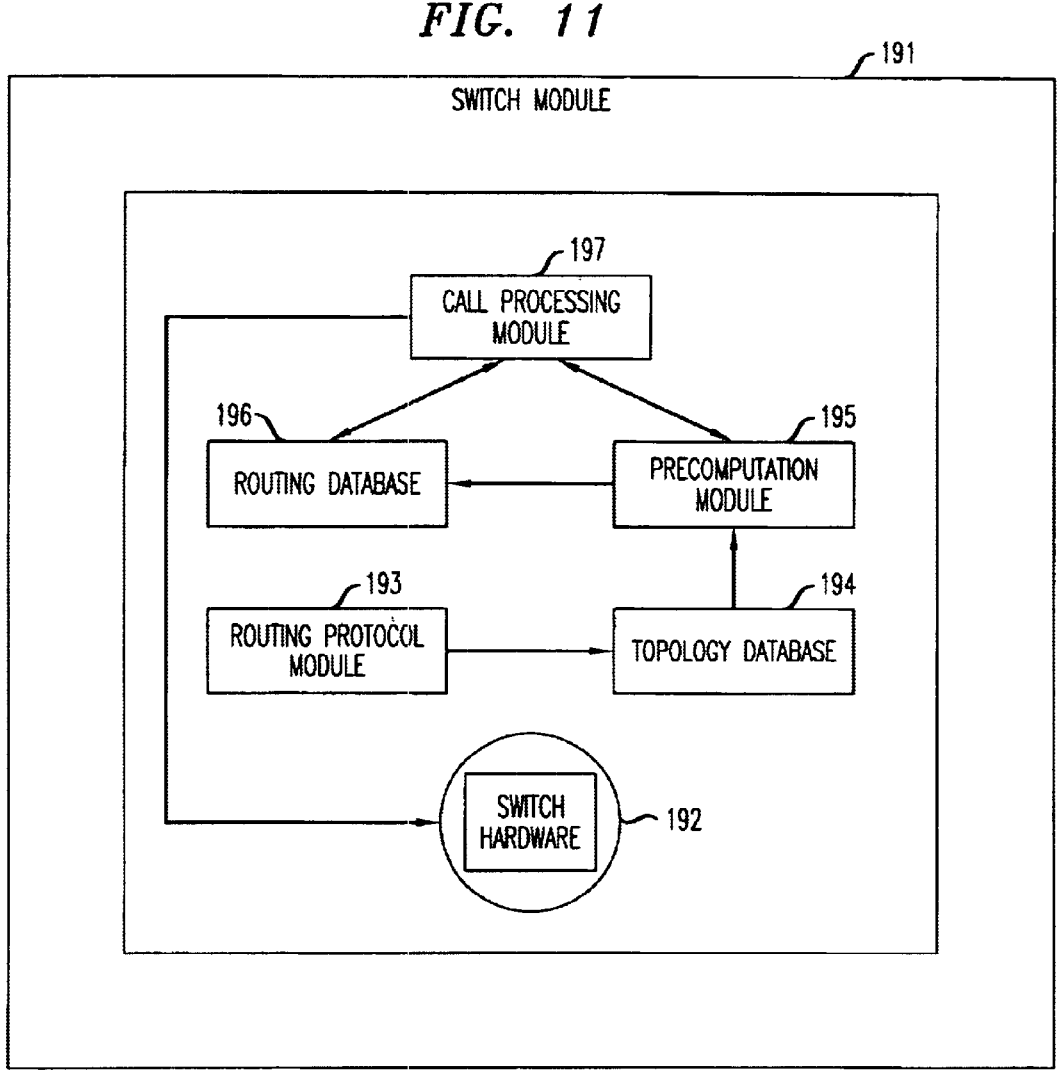
FIG. 11 shows a system diagram in block diagrammatic form for a hierarchical network using the PNNI telecommunications standard.

As shown in FIG. 5, the algorithm of FIGS. 4A and 4B is used, according to the present invention, in the precomputation of routing tables in a flat (non-hierarchical) network The flow diagram of FIG. 5 basically implements precomputation of "shortest path" routes using the shortest path algorithm described above and stores the routes for different values of CDV (or t) in a routing table or cache memory (See FIG. 11). Store the path(s) in a cache of the form (Traffic descriptor, CDV, route).

In more detail, in FIG. 5, the precomputation of routing tables starts with the selection of one (e.g., k=1) of the numbers and sizes of bandwidths (BW(k)), cumulative cell delay variation (CDV(k)), and cumulative administrative weight (AW(k)) options available for interconnection in the network. Thus, step 91 sets k=1, and step 92 selects BW(k), CDV(k), and AW(k).

Step 93 then prunes the search of the network so that only links having bandwidth greater than BW(k) are investigated. Step 94 applies the algorithm of FIGS. 4A and 4B to find the shortest paths f satisfying the CDV(k) and AW(k) requirements from the node in which this algorithm is being executed to all other nodes in the network. Step 95 writes the result into the routing table. As indicated in steps 96–98, this procedure is repeated for each available bandwidth, cell delay variation, and administrative weight that may appear in a call setup request.

Figure 6:
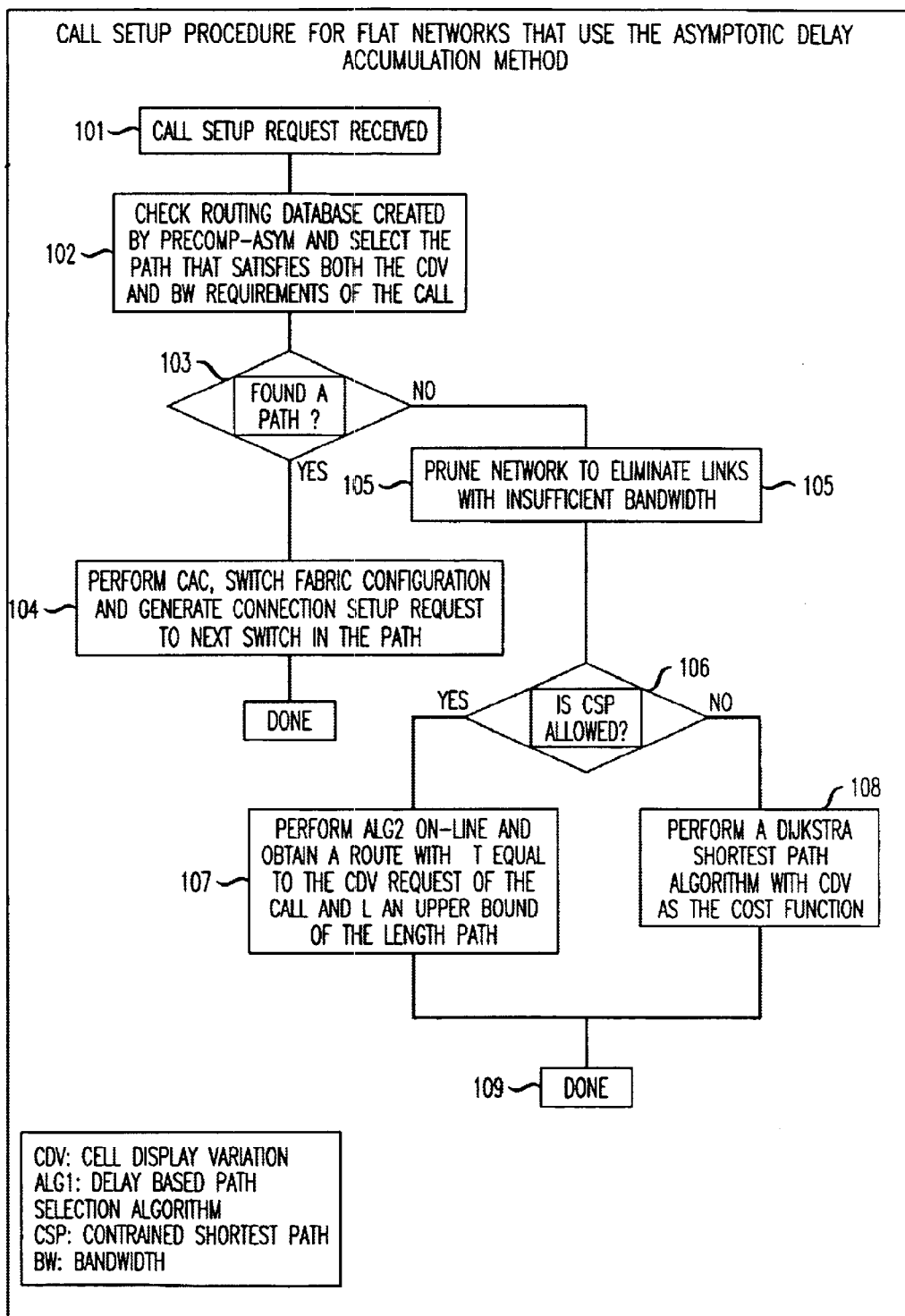
FIG. 6 shows a call setup procedure at a switch for a flat network using routing data created according to FIGS. 4A, 4B, and 5.

FIG. 6 illustrates the call setup procedure invoked by a call setup request (Step 101) in a flat network.

When the call setup request arrives at a switch (See FIG. 11), step 102 selects an optimal path from the table of precomputed routes that satisfies both the CDV and BW constraints in the call setup request.

Step 103 checks whether a path was found. If so, in step 104, call admission control and switch configuration are performed, and a connection setup request to the next switch in the path is generated. If not, an on-the-fly procedure, starting at step 105, is invoked to find an appropriate path. Step 105 prunes the search so that network links with insufficient bandwidth to satisfy the call setup request are not searched. Before the on-the-fly search is actually commenced, step 106 employs a decision circuit to decide whether the use of the constrained shortest path algorithm of FIGS. 4A and 4B is allowed. The answer is "Yes" if its use is judged to be not too expensive in terms of time and resources. Then step 107 uses the algorithm of FIGS. 4A and 4B in real time. Otherwise the answer is "No", and step 108 performs a Dijkstra shortest path algorithm with cell delay variation as the cost function. Once a path is found, the procedure is ended (step 109).

Figure 7:
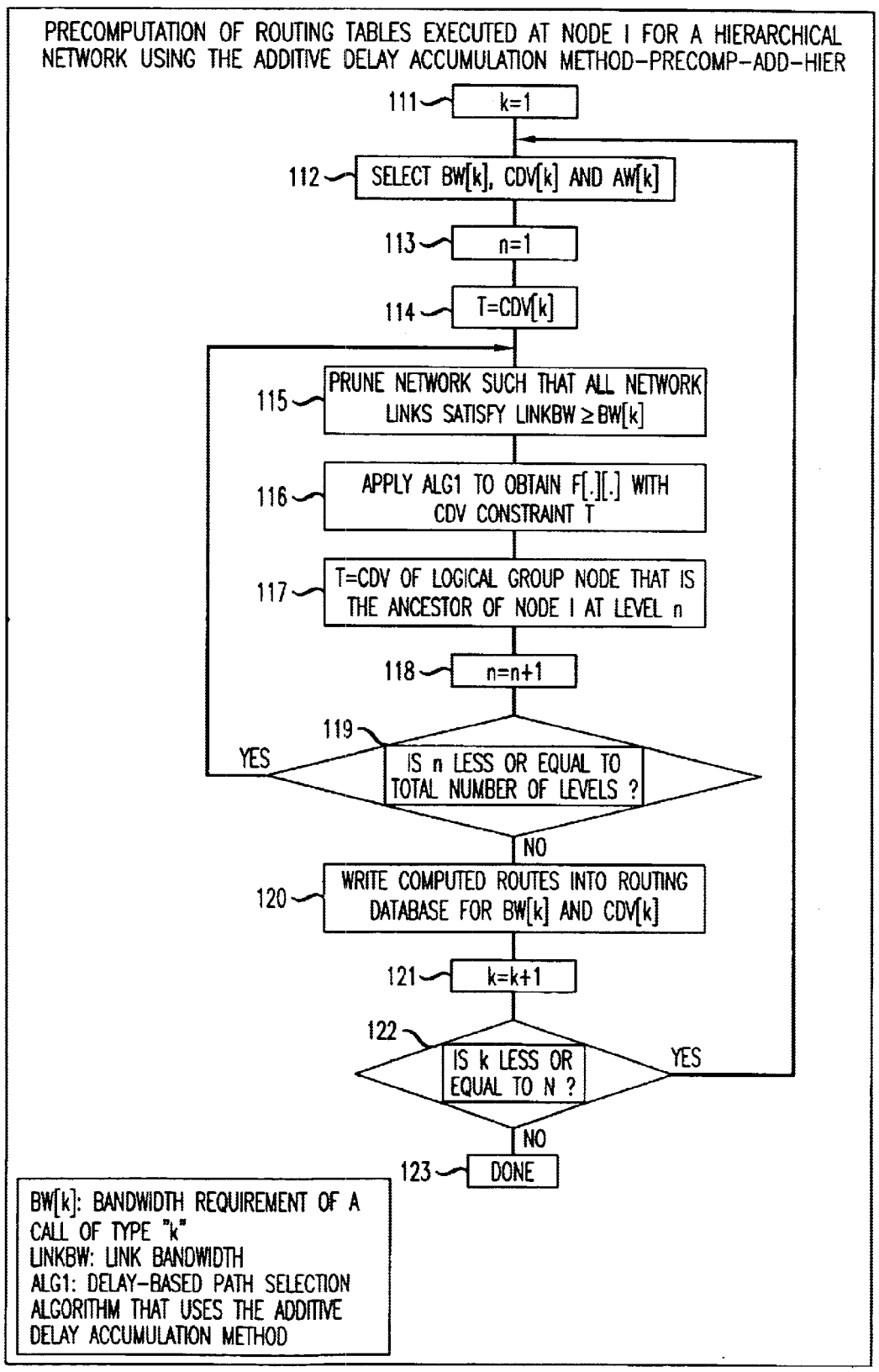
FIG. 7 shows a flow chart for the precomputation of routing tables in a hierarchical network using the algorithm of FIGS. 1A and 1B.
Figure 12:
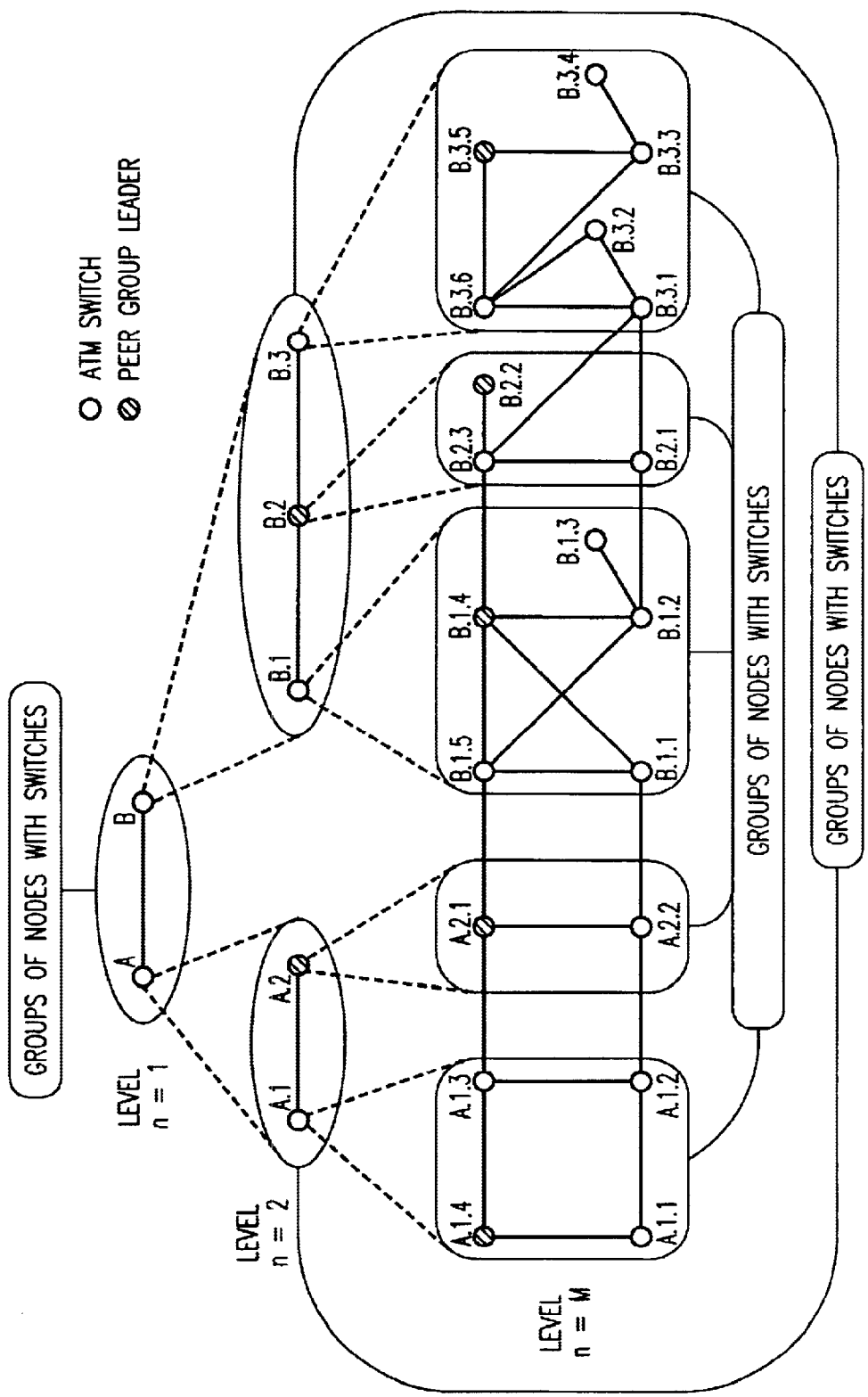
FIG. 12 shows a general description of a hierarchical telecommunication network.

As shown in FIG. 7, the algorithm of FIGS. 1A and 1B is used, according to the present invention, in the precomputation of routing tables in a hierarchical network (see FIG. 12). The flow diagram of FIG. 7 basically implements precomputation of "shortest path" routes using the shortest path algorithm of FIGS. 1A and 1B and stores the routes for different values of CDV (or t) in a routing table or cache memory (See FIG. 11). Store the path(s) in a cache of the form (Traffic descriptor, CDV, route).

In more detail, in FIG. 7, the precomputation of routing tables starts with the selection of one (e.g., k=1) of the numbers and sizes of bandwidths (BW(k)) and cell delay variation (CDV(k)) options available for interconnection in the network. Thus, step 111 sets k=1, and step 112 selects BW(k) and CDV(k).

Step 113 sets n=1, representing the topmost level of the hierarchical network. Step 114 sets the maximum allowable amount T, according to the request, of the cumulative cell delay variation CDV(k).

Step 115 then prunes the search of the network so that only links having bandwidth greater than BW(k) are investigated. Step 116 applies the algorithm of FIGS. 1A and 1B to find the shortest paths f satisfying the CDV(k) requirement with constraint T from the node in which this algorithm is being executed to all other nodes in the peer group at level n. Step 117 sets T equal to the cell delay variation of the logical group node that is the ancestor (in level n, FIG. 12) of node I, which is the node handling the call setup request, at level n. Step 118 increments n to n+1; and step 119 uses a decision circuit to check whether n is less than or equal to the total number of levels (FIG. 12). If "yes", the process loops back to step 115 to perform route precomputation at each level of the hierarchical network. If "no", step 120 writes the computed routes into the routing database for BW(k) and CDV(k). As indicated in steps 121–123, this procedure is repeated for each available bandwidth and cell delay variation that may appear in a call setup request.

Figure 8:
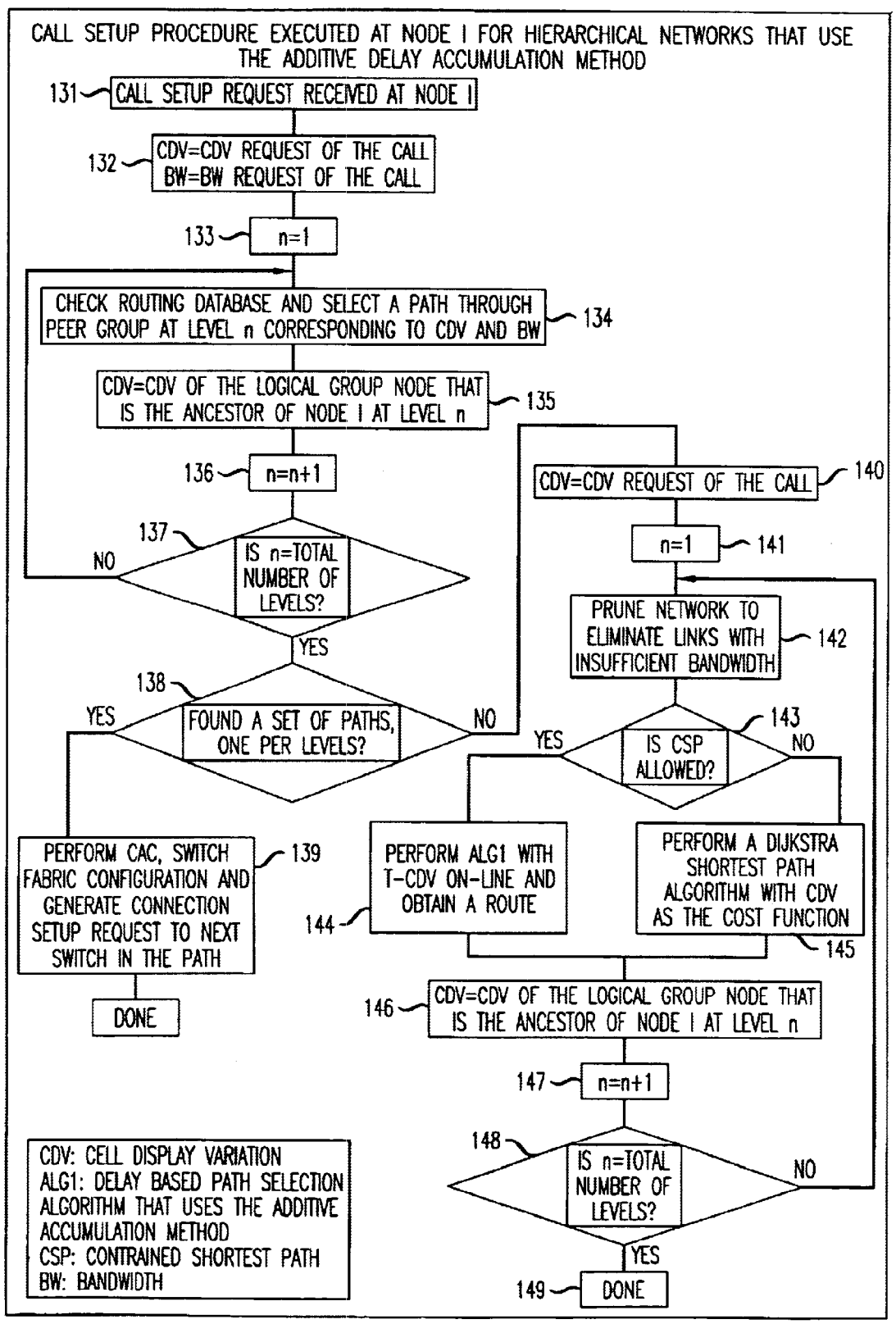
FIG. 8 shows a call setup procedure at a switch for a hierarchical network using routing data created according to FIGS. 1A, 1B, and 7.

FIG. 8 illustrates the call setup procedure invoked by a call setup request (Step 131) in a hierarchical network.

When the call setup request arrives at a switch (See FIG. 11), step 132 sets maximum cell delay variation and bandwidth equal to those specified in the call setup request. Step 133 sets n=1, representing the the topmost level of the hierarchical network. Step 134 selects an optimal path through the peer group at level n from the table of precomputed routes that satisfies both the CDV and BW constraints in the call setup request.

Step 135 sets CDV equal to the CDV of the logical group node that is the ancestor of node I at level n. Step 136 increments n to n+1; and step 137 uses a decision circuit to test whether n is equal to the total number of levels. If "no", the process returns to step 134. If "yes", at step 138 a decision circuit checks whether a set of paths, one per level, was found. If so, in step 139, call admission control and switch configuration are performed, and a connection setup request to the next switch in the path is generated, the process being done at the current switch.

If a set of paths was not found, an on-the-fly procedure, starting at step 140, is invoked to find an appropriate path. Step 141 resets n to 1. Step 142 prunes the search so that network links with insufficient bandwidth to satisfy the call setup request are not searched. Before the on-the-fly search is actually commenced, step 143 employs a decision circuit to decide whether the use of the constrained shortest path algorithm of FIGS. 1A and 1B is allowed. The answer is "Yes" if its use is judged to be not too expensive in terms of time and resources. Then step 144 uses the algorithm of FIGS. 1A and 1B in real time.

Otherwise the answer is "No", and step 145 performs a Dijkstra shortest path algorithm with cell delay variation as the cost function. So that a set of paths through peer groups at all levels may be found, step 146 sets CDV equal to CDV of the logical group node that is the ancestor of node I at level n. Step 147 increments n to n+1. Step 148 uses a decision circuit to check whether n has reached the total number of levels. If not, the process is returned to step 142. Once a complete set of paths is found, the procedure is ended (step 149).

Figure 9:
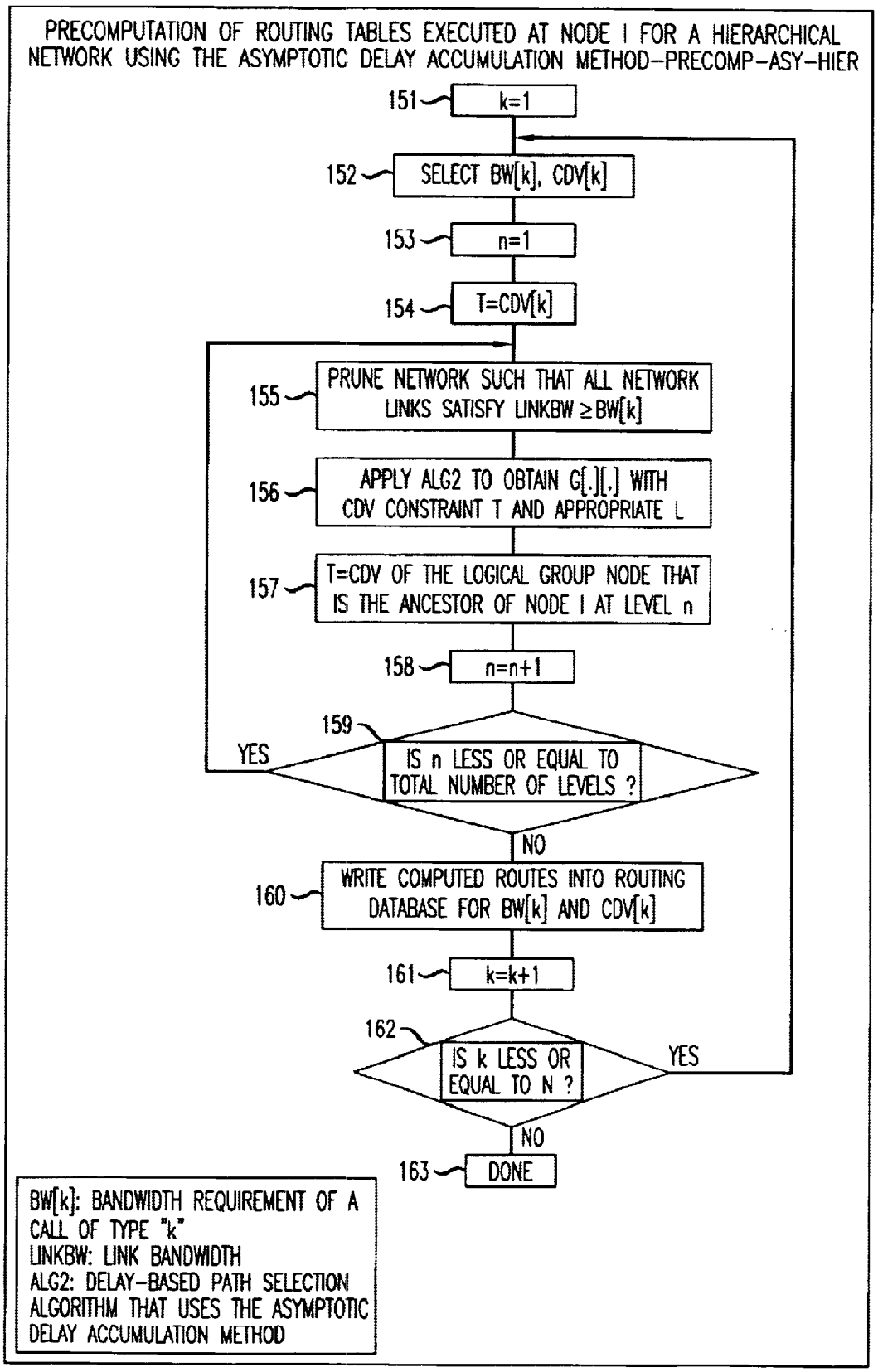
FIG. 9 shows a flow chart for the precomputation of routing tables in a hierarchical network using the algorithm of FIGS. 4A and 4B.

As shown in FIG. 9, the algorithm of FIGS. 4A and 4B is used, according to an asymptotic implementation of the present invention, in the precomputation of routing tables in a hierarchical network (see FIG. 12). The flow diagram of FIG. 9 basically implements precomputation of "shortest path" routes using the shortest path algorithm of FIGS. 4A and 41B and stores the routes for different values of CDV (or t) in a routing table or cache memory (See FIG. 11). The table or data base is a cache of the form (Traffic descriptor, CDV, route).

In more detail, in FIG. 9, the precomputation of routing tables starts with the selection of one (e.g., k=1) of the numbers and sizes of bandwidths (BW(k)) and cell delay variation (CDV(k)) options available for interconnection in the network. Thus, step 151 sets k=1, and step 152 selects BW(k) and CDV(k).

Step 153 sets n=1, representing the topmost level of the hierarchical network. Step 154 sets the maximum allowable amount T, according to the request, of the cumulative cell delay variation CDV(k).

Step 155 then prunes the search of the network so that only links having bandwidth greater than BW(k) are investigated. Step 156 applies the algorithm of FIGS. 4A and 4B to find the shortest paths f satisfying the CDV(k) requirement with constraint T from the appropriate node I in which this algorithm is being executed to all other nodes in the peer group at level n. Step 157 sets T equal to the cell delay variation of the logical group node that is the ancestor (in level n, FIG. 12) of node I at level n. Step 158 increments n to n+1; and step 159 uses a decision circuit to check whether n is less than or equal to the total number of levels (FIG. 12). If "yes", the process loops back to step 155. If "no", step 160 writes the computed routes into the routing database for BW(k) and CDV(k). As indicated in steps 161–163, this procedure is repeated for each available bandwidth and cell delay variation that may appear in a call setup request.

Figure 10:
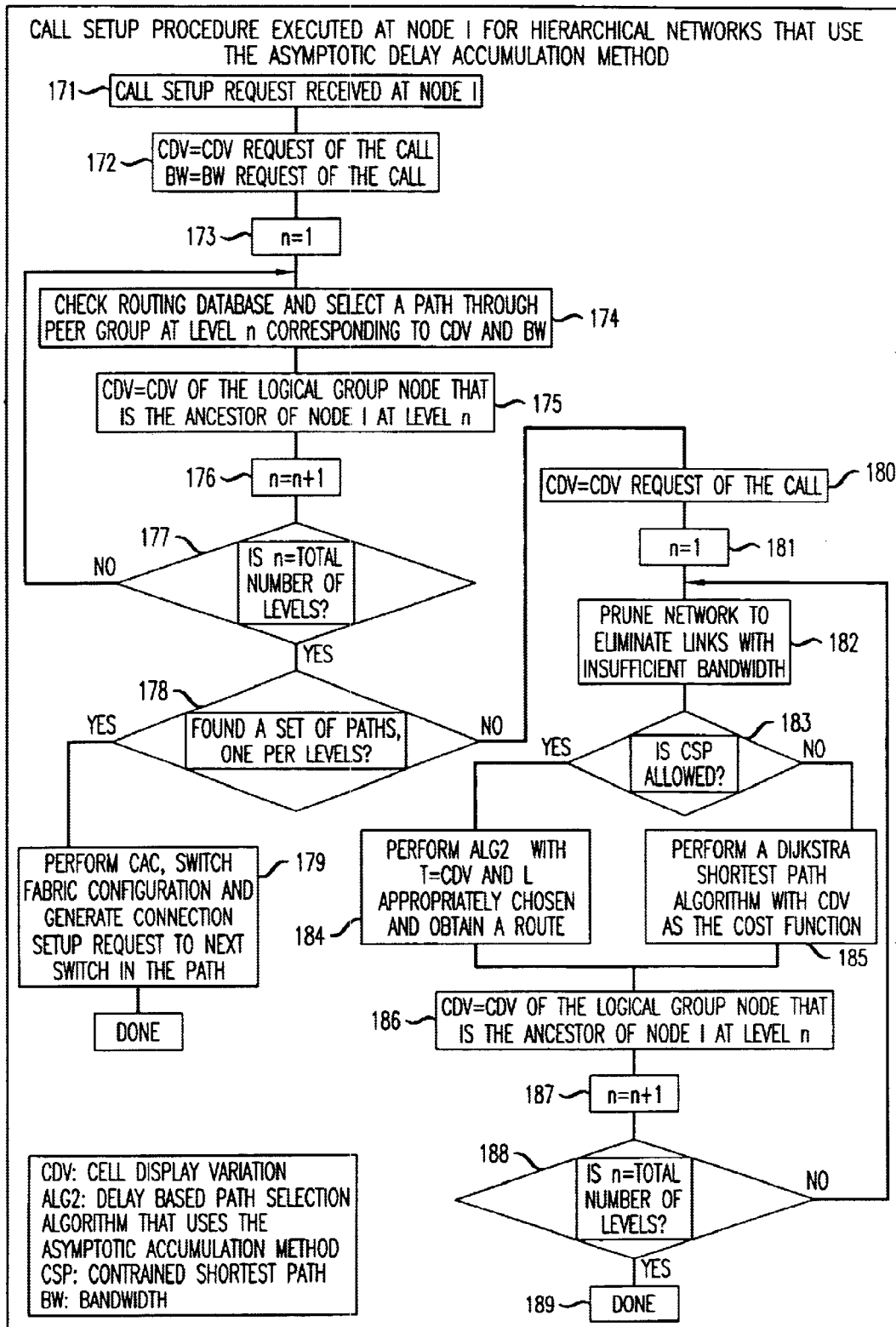
FIG. 10 shows a call setup procedure at a switch for a hierarchical network using routing data created according to FIGS. 4A, 4B, and 9.

FIG. 10 illustrates the call setup procedure invoked by a call setup request (Step 171) in a hierarchical network.

When the call setup request arrives at a switch (See FIG. 11), step 172 sets maximum cell delay variation and bandwidth equal to those specified in the call setup request. Step 173 sets n=1, representing the topmost level of the hierarchical network. Step 174 selects an optimal path through the peer group at level n from the table of precomputed routes that satisfies both the CDV and BW constraints in the call setup request.

Step 175 sets CDV equal to the CDV of the logical group node that is the ancestor of node I at level n. Step 176 increments n to n+1; and step 177 uses a decision circuit to test whether n is equal to the total number of levels. If "no", the process returns to step 174. If "yes", at step 178 a decision circuit checks whether a set of paths, one per level, was found. If so, in step 179, call admission control and switch configuration are performed, and a connection setup request to the next switch in the path is generated, the process being done at the current switch.

If a set of paths was not found, an on-the-fly procedure, starting at step 180, is invoked to find an appropriate path. Step 181 resets n to 1. Step 182 prunes the search so that network links with insufficient bandwidth to satisfy the call setup request are not searched. Before the on-the-fly search is actually commenced, step 183 employs a decision circuit to decide whether the use of the constrained shortest path algorithm of FIGS. 4A and 4B is allowed. The answer is "Yes" if its use is judged to be not too expensive in terms of time and resources. Then step 184 uses the algorithm of FIGS. 4A and 4B in real time. Otherwise the answer is "No", and step 185 performs a Dijkstra shortest path algorithm with cell delay variation as the cost function. So that a set of paths through peer groups at all levels may be found, step 186 sets CDV equal to CDV of the logical group node that is the ancestor of node I at level n. Step 187 increments n to n+1. Step 188 uses a decision circuit to check whether n has reached the total number of levels. If not, the process is returned to step 182. Once a complete set of paths is found, the procedure is ended (step 189).

In FIG. 11, a switch module is shown block diagrammatically to point out the relationship between the typical switch hardware 192 and the various software or firmware and database modules 193–197, as employed according to the present invention.

In brief, the routing protocol 193, involving basic routing rules, accesses topology database 194 to set up numbering of nodes (and levels, if applicable), particularly with respect to network boundaries. Additional portions of database 194 are accessed and employed by precomputation module 195 (per FIGS. 2, 5, 7, and 9, each employing respective ones of FIGS. 1A, 1B, 4A and 4B) to commence the precomputation process.

The results are stored in routing database 196. Stored values in routing database 196 are fed to call processing module 197 (per FIGS. 3, 6, 8, and 10) upon request therefrom. Call processing module 197 appropriately activates switch hardware 192.

FIG. 12 illustrates the peer group clustering of nodes or switches in a hierarchical network. For purposes of illustration, asynchronous transfer mode switches are assumed to be at the nodes. With equal validity, other types of switches can, and are, assumed to be at the switches. Nodes at level n=M which includes switches A.1.1, A.1.2, A.1.3, A.1.4, A.2.1, A.2.2, B.1.1, B.1.2, B.1.3, B.1.4, B.1.5, B.2.1, B.2.2, B.2.3, B.3.3, B.3.4, B.3.5, and B.3.6 represent physical switches. Nodes at higher levels, n=2 and n=1, are logical group nodes that represent peer groups.

While the invention has been described above in preferred implementations, it should be apparent from the above description or may become apparent from the practice of the invention. All implementations for delay-based shortest path selection will employ the basic advance of the invention, as set forth in the claims below or equivalents thereof.

What is claimed is:

1. A method for use in a communication network including a plurality of network terminal nodes and a plurality of packet switches, comprising the steps of:

determining topology of the network, link weights, and delay-related parameters; and providing from a first one of said plurality of network terminal nodes to a second one of said plurality of network terminal nodes at least one delay-based shortest transmission path via at least one of said plurality of packet witches, including the step of selecting said path on the basis of a particular delay-related parameter, and including precomputing a multiplicity of sets of shortest paths, wherein the step of providing at least one delay-based transmission path includes the step of employing a restricted shortest path algorithm, further including the step of precomputing possible delay-based transmission paths in advance of cell call set up request.

2. The method according to claim 1, wherein the step of employing a restricted shortest path algorithm comprises employing an additive-type restricted shortest path algorithm.

3. The method according to claim 2, wherein the step of employing an additive-type restricted shortest path algorithm comprises:

defining $l_{ij}$ and $t_{ij}$ to be the administrative weight (AW) and the cell delay variation (CDV) of the link that connects nodes i and j, respectively. Let T be an upper bound (delay constraint up to T) on the end-to-end CDV of any path in the network and $f_i(t)$ the length of a shortest path from node 1 to node i with CDV less or equal to t;

1. Initializing $f_1(t) = 0, \quad t = 0, \cdots, T$;

2. Initializing $f_j(0) = \infty, \quad j = 2, \cdots, N$, where the $\infty$ implies a number large enough that a sufficiently exhaustive search of possible links can be made;

computing $f_j(t)=\min \{f_j(t-1), \min_{k|t_{kj} \leq t} \{f_k(t-t_{kj})+1_{kj}\}\}$ j= 2, ..., N, t=1, ..., T; and checking whether the at least one delay-based transmission path exists with delay not greater than $f_j(t)$.

4. The method according to claim 1, wherein the step of employing a restricted shortest path algorithm comprises employing an asymptotic-type restricted shortest path algorithm.

5. The method according to claim 1, wherein the providing step, in response to a call setup request, includes the step of checking for a suitable precomputed delay-based transmission path.

6. The method according to claim 5, wherein the providing step, in the case of failure of a suitable precomputed delay-based transmission path, computes on-the-fly a suitable delay-based transmission path.

7. The method according to claim 6, wherein the communication network is a flat network in which topology known to any of the plurality of packet switches is equally known to all of the plurality of packet switches, and wherein the steps are employed in that flat network.

8. The method according to claim 6, wherein the communication network is a hierarchical network in which the plurality of packet switches are organized in peer groups and topology of a respective portion of the network including each peer group is best known within that peer group and is known only by way of a summary in other peer groups, and where the steps are employed in that hierarchical network.

9. The method according to claim 1, wherein the communication network is a flat network in which topology known to any of the plurality of packet switches is equally known to all of the plurality of packet switches, and wherein steps are employed in that flat network.

10. The method according to claim 1, wherein the communication network is a hiearchical network in which the plurality of packet switches are organized in peer groups and topology of a respective portion of the network including each peer group is best knowithin that peer group and is known only by way of a summary in other peer groups, and where the steps are employed in that hierarchical network.

11. The method according to claim 10, wherein the providing step includes the step of pruning the search for a suitable delay-based transmission path by excluding from consideration all paths having bandwidth less than a prescribed amount.

12. A method for use in a communication network including a plurality of network terminal nodes and a plurality of packet switches, comprising the steps of:

determining topology of the network, link weights, and delay-related parameters; and providing from a first one of said plurality of network terminal nodes to a second one of said plurality of network terminal nodes at least one delay-based shortest transmission path via at least one of said plurality of packet switches, including the step of selecting said path on the basis of a particular delay-related parameter, and including precomputing a multiplicity of sets of shortest paths, wherein the step of providing at least one delay-based transmission path includes the step of employing a restricted shortest path algorithm, wherein the step of employing restricted shortest path algorithm comprises employing an asymptotic-type restricted shortest path algorithm, wherein the step of employing an asymptotic-type restricted shortest path algorithm comprises the steps of:

defining $l_{ij}$ and $t_{ij}$ to be the AW and CDV of the link that connects nodes i and j, respectively, letting L be an upper bound on the end-to-end delay of any path in the network, letting $g_i(l)$, $\mu_i(l)$, $\sigma_i^2(l)$ and $d_i(l)$ be the CDV, the cumulative mean of the delay, the cumulative variance of the delay and the discrepancy of the delay of a shortest path from node 1 to node i with AW at most l;

initializing $g_i(l) = 0 \quad l = 0, \cdots, L$;

initializing $g_j(0) = \infty \quad j = 2, \cdots, N$;

initializing $\mu_i(l) = \mu_j(l) = \sigma_i^2(l) = d_j(l) = 0, l = 0, \cdots, L$, $j = 2, \cdots, N, l = 1, \cdots, L$, where $g_{k \otimes} t_{kj} \mu_k(l-l_{kj})+\mu_{kj}+[\sqrt{\sigma_k^2}(l-l_{kj})+\sigma_{kj}^2] \times t(\alpha)+\max\{d_k(l-l_{kj}), d_{kj}(\alpha)\}$;

and is defined as:

checking whether the at least one delay-based transmission path exists with delay not greater than $g_i(l)$.

13. The method according to any one of claims 12, further including the step of precomputing possible delay-based transmission paths in advance of cell call set up request.

14. A method for use in a communication network including a plurality of network terminal nodes and a plurality of packet switches, comprising the steps of:

determining topology of the network, link weights, and delay-related parameters; and providing from a first one of said plurality of network terminal nodes to a second one of said plurality of network terminal nodes at least one delay-based shortest transmission path via at least one of said plurality of packet switches, including the step of selecting said path on the basis of a particular delay-related parameter, and including precomputing a multiplicity of sets of shortest paths, wherein the step of providing at least one delay-based transmission path includes the step of employing a restricted shortest path algorithm, wherein the providing step, in response to a call setup request, computes on-the-fly a suitable delay-based transmission path.

15. The method according to claim 14, wherein the communication network is a flat network in which topology known to any of the plurality of packet switches is equally known to all of the plurality of packet switches, and wherein the steps are employed in that flat network.

16. The method according to claim 14, wherein the communication network is a hierarchical network in which the plurality of packet switches are organized in peer groups and topology of a respective portion of the network including each peer group is best known within that peer group and is known only by way of a summary in other peer groups, and where the steps are employed in that hierarchical network.

17. The method according to claim 16, wherein the step of computing on-the-fly a suitable delay-based transmission path comprises the steps of first finding a path in level one peer groups and then finding paths through other peer groups based on the pertinent summary and any reported values of the particular delay-related parameter.

18. The method according to claim 14, wherein the step of employing a restricted shortest path algorithm comprises employing an additive-type restricted path algorithm.

19. The method according to claim 18, wherein the step of employing an additive-type restricted shortest path algorithm comprises:

defining $1_{ij}$ and $t_{ij}$ to be the administrative weight (AW) and the cell delay variation (CDV) of the link that connects nodes i and j, respectively. Let T be an upper bound (delay constraint up to T) on the end-to-end CDV of any path in the network and $f_i(t)$ the length of a shortest path from node 1 to node I with CDV less or equal to t;

Initializing $f_i(t) = 0 \quad t = 0, \cdots, T$;

Initializing $f_i(0) = \infty \quad j = 2, \cdots, N$, where the ∞ implies a number large enough that a sufficiently exhaustive search of possible links can be made;

computing $f_i(t)=\min \{f_i(t-1), \min_{k|t_{kj}\leq t}\{f_k(t-t_{kj})+1_{kj}\}\}$
j=2, . . . ,N,t=1, . . . ,T;

and checking whether the at least one delay-based transmission path exists with delay not greater than $f_i(t)$.

20. The method according to claim 18, wherein the step of employing restricted shortest path algorithm comprises employing an asymptotic-type restricted shortest path algorithm.

21. A method for use in a communication network including a plurality of network terminal nodes and a plurality of packet switches, comprising the steps of:

determining topology of the network, link weights, and delay-related parameters; and providing from a first one of said plurality of network terminal nodes to a second one of said plurality of network terminal nodes at least one delay-based shortest transmission path via at least one of said plurality of packet switches, including the step of selecting said path on the basis of a particular delay-related parameter, and including precomputing a multiplicity of sets of shortest paths, wherein the step of providing at least one delay-based transmission path includes the step of employing a restricted shortest path algorithm, wherein the providing step, in response to a call setup request, computes on-the-fly a suitable delay-based transmission path, and wherein the step of employing an asymptotic-type restricted shortest path algorithm comprises the steps of:

defining $l_{ij}$ and $t_{ij}$ to be the AW and CDV of the link that connects nodes i and j, respectively; letting L be an upper bound on the end-to-end delay of any path in the network; letting $g_i(l)$, $\mu_i(l)$, $\sigma_i^2(l)$ and $d_i(l)$ be the CDV, the cumulative mean of the delay, the cumulative variance of the delay and the discrepancy of the delay of a shortest path from node 1 to node i with AW at most 1;

initializing $g_i(l) = 0 \quad l = 0, \cdots, L$;

initializing $g_i(0) = \infty \quad j = 2, \cdots, N$;

initializing $\mu_i(l) = \mu_j(l) = \sigma_i^2(l) = d_j(l) = 0, 1 = 0, \cdots, L$, $j = 2, \cdots, N, l = 1, \cdots, L$, where $g_k \oplus t_{kj}, \mu_k(l-l_{kj})+\mu_{kj}+[\sqrt{\sigma_k^2}(l-l_{kj})+\sigma_{kj}^2]\times t(\alpha)+\max\{d_k(1-l_{kj}),d_{kj}(\alpha)\}$;

and is defined as:

checking whether the at least one delay-based transmission path exists with delay not greater than $g_i(l)$.

* * * * *

UNITED STATES PATENT AND TRADEMARK OFFICE
CERTIFICATE OF CORRECTION

PATENT NO. : 6,687,229 B1
DATED : February 3, 2004
INVENTOR(S) : Deepak Kataria et al.

It is certified that error appears in the above-identified patent and that said Letters Patent is hereby corrected as shown below:

<u>Title page,</u>
Insert item, -- [73] Assignee: Lucent Technologies Inc., Murray Hill, N.J. --

Signed and Sealed this

Tenth Day of August, 2004

JON W. DUDAS
*Acting Director of the United States Patent and Trademark Office*